Jan. 20, 1959  R. J. GAUDREAU  2,869,755
APPARATUS FOR DISCHARGING SUCCESSIVE
ARTICLES FROM A STACK THEREOF
Filed Feb. 6, 1956  3 Sheets-Sheet 1

INVENTOR.
Richard J. Gaudreau
BY

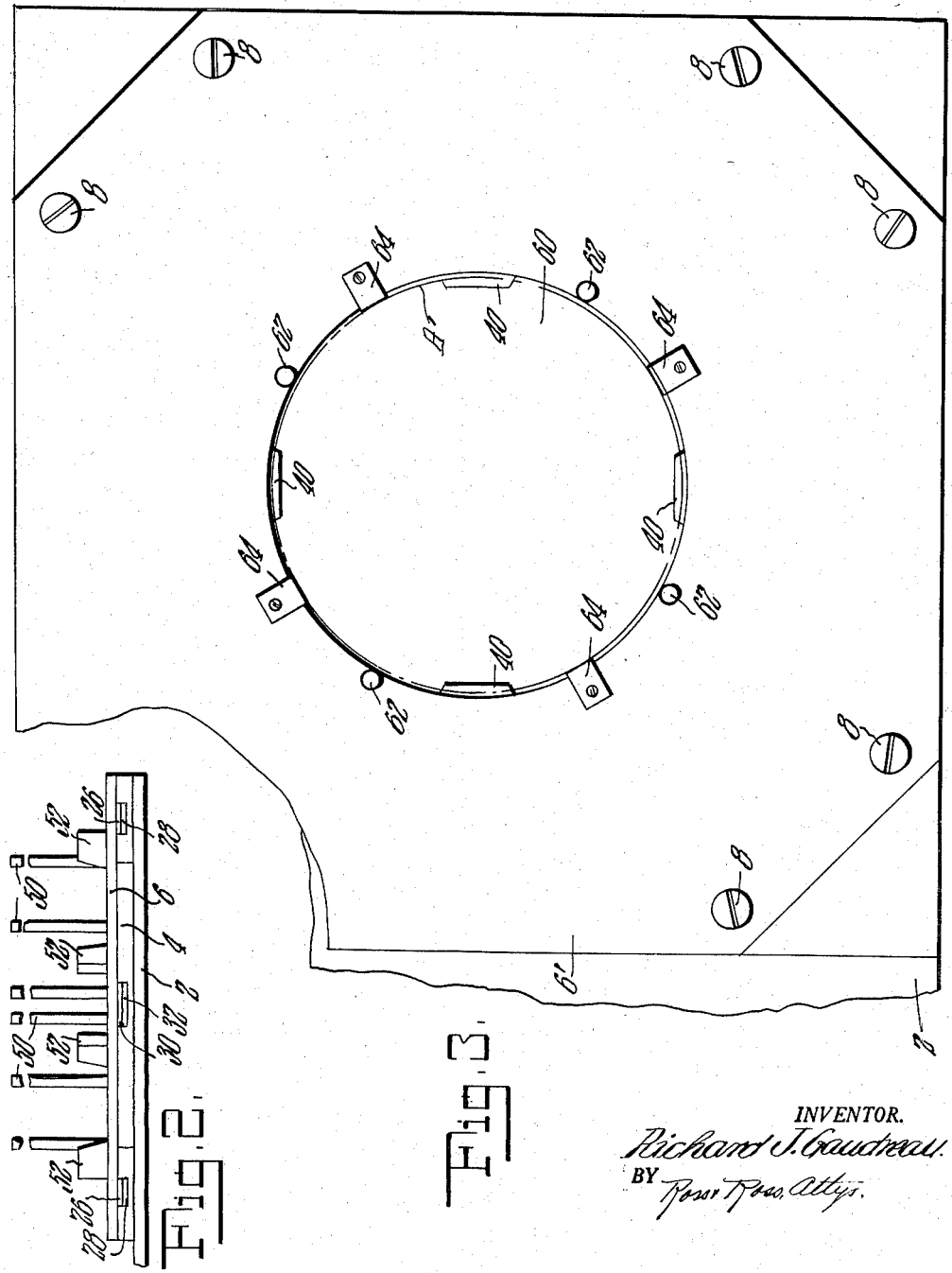

Jan. 20, 1959     R. J. GAUDREAU     2,869,755
APPARATUS FOR DISCHARGING SUCCESSIVE
ARTICLES FROM A STACK THEREOF
Filed Feb. 6, 1956     3 Sheets-Sheet 3
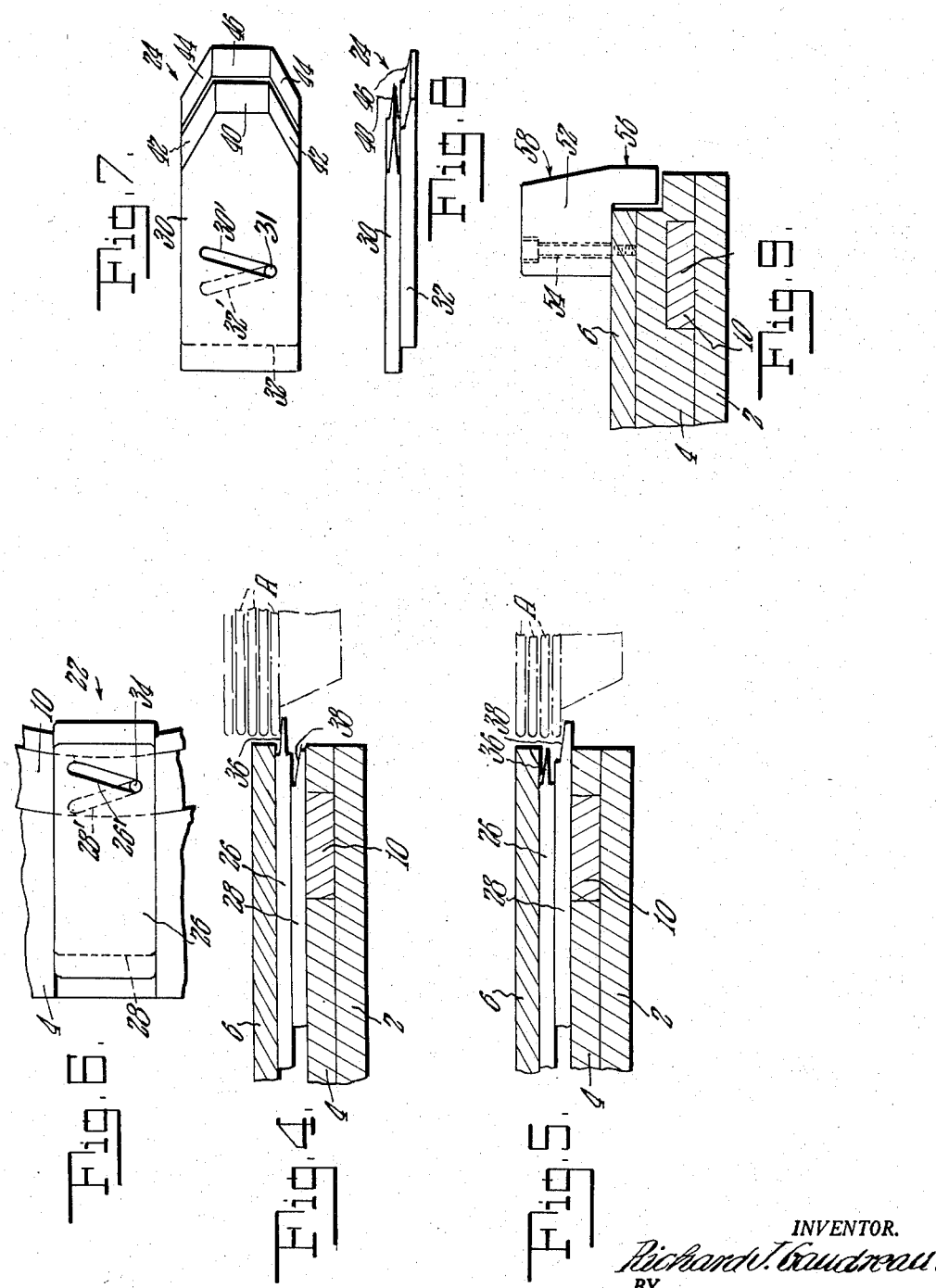
INVENTOR.
Richard J. Gaudreau
BY

United States Patent Office 2,869,755
Patented Jan. 20, 1959

2,869,755

APPARATUS FOR DISCHARGING SUCCESSIVE ARTICLES FROM A STACK THEREOF

Richard J. Gaudreau, Longmeadow, Mass., assignor to Production Tool & Die Co., Inc., Springfield, Mass., a corporation.

Application February 6, 1956, Serial No. 563,619

1 Claim. (Cl. 221—93)

This invention relates to improvements in apparatus for discharging or releasing successive articles from a stack thereof.

The principal objects of the invention are directed to novel apparatus for delivering successive articles from the bottom of a stack of articles.

The apparatus is constructed and arranged in a novel manner for discharging a plurality of lowermost articles from a plurality of stacks of articles simultaneously.

The novel apparatus of the invention is adapted for use with articles of various forms but is particularly adapted for discharging the lowermost article or articles from a stack or stacks, such as pie plates or dished articles. It will be understood that the apparatus is not limited thereto.

It is often desired to discharge a plurality of articles such as dishes, pie plates, or the like, simultaneously onto a conveyor or other apparatus for filling or other subsequent operations and same is made possible by means of this apparatus. It may also be desired to discharge successive single plates or dishes from a single stack thereof. The apparatus is readily and easily adapted for releasing or discharging a plurality of plates from a plurality of stacks or for releasing a single plate from a single stack, all as may be desired.

In the drawings:

Fig. 2 is a small scale front edge elevational view of the apparatus shown in Fig. 1;

Fig. 3 is a plan view, similar to Fig. 1, showing the apparatus arranged for relatively large size plates, or dishes;

Fig. 4 is a sectional elevational view on the line 4—4 of Fig. 1;

Fig. 5 is a view, similar to Fig. 4, showing the parts in a different relative position;

Fig. 6 is a plan view of a primary support slide and a separator slide in superposed position;

Fig. 7 is a plan view of an upper separator and a lower support slide in superposed position;

Fig. 8 is a side elevational view of the slides shown in Fig. 7; and

Fig. 9 is a sectional elevational view on the line 9—9 of Fig. 1.

Figure 1:
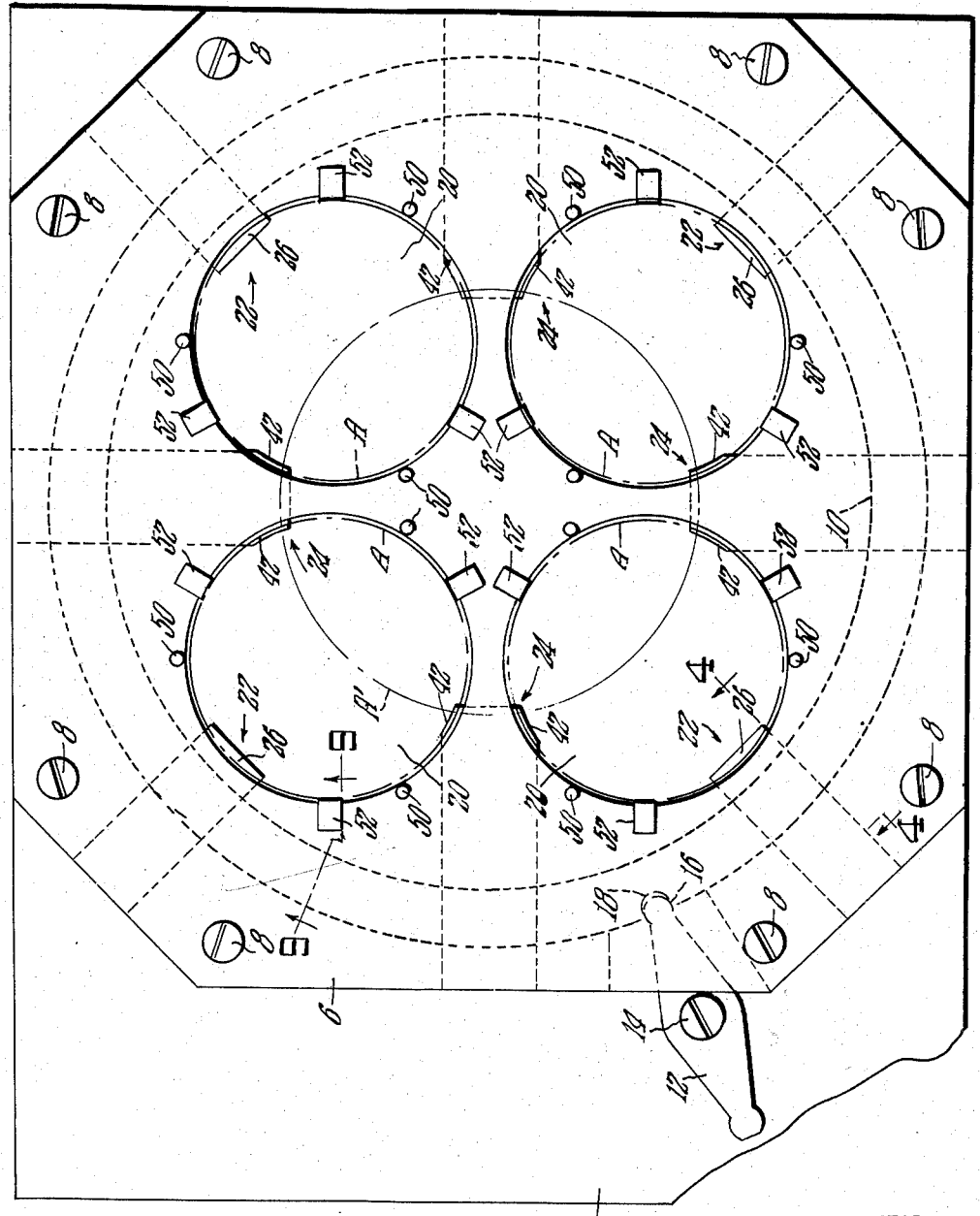
Fig. 1 is a plan view of the apparatus of the invention.

Referring now to the drawings in detail, the novel apparatus of the invention will be fully described.

A base plate 2 is provided, on which is secured in superposed relation an intermediate plate 4. A cover plate 6 is removably secured to the intermediate plate by screws 8 or the like, see Figs. 1 and 2.

As shown in Fig. 1, the apparatus is arranged for plural stacks of articles represented by dot-dash lines A but may be used for one stack of articles indicated by A', as will later appear.

An actuator 10, in the form of a ring, is oscillatable, in opposite directions, on the base plate 2 and within the intermediate plate 4. The actuator may be oscillated by any desired means such as a lever 12 pivoted at 14 for swinging and having an inner end 16 disposed in a notch 18 of the actuator, see Fig. 1.

Said lever 12 may be oscillated by means such as shown in pending application Ser. No. 563,560, filed Feb. 6, 1956. Otherwise, the actuator 10 may be oscillated by electrical means such as a solenoid or the like.

In Fig. 1, the cover plate 6 is provided with openings 20 for vertically disposed stacks of articles such as dishes or plates indicated by A. The other plates will be arranged for the passage of articles downwardly.

Underlying the cover plate 6 and slidable relative to the intermediate plate 4 are pairs 22 of primary slide members and pairs 24 of secondary slide members 24. All of the slide members reciprocate radially.

The pairs 22 of slide members consist of an upper separator slide 26 and a stack support slide 28. The pairs of slide members 24 consist of an upper separator slide 30 and a lower support slide 32, see Figs. 7 and 8.

The slides 26 and 28 of each pair 22 are provided with angularly related slots 26' and 28' which receive a pin or stud 34 of the actuator 10, as shown in Fig. 6. The slides 30 and 32 of each pair are provided with angularly related slots 30' and 32' for the reception of studs 31 of the actuator 10, similar to studs 34, as shown in Fig. 7. The slots may be of any length or angle to provide the desired strokes of travel for different articles and said slots may include dual portions if desired.

As the actuator is oscillated back and forth, the slides of each pair thereof are reciprocated simultaneously in opposite directions. Front or inner ends of the upper slides of the pairs are extended inwardly while the inner ends of the lower slides are being retracted and vice versa.

The inner ends of the slides 26 are more or less pointed at 36, as shown, and adapted to enter between the adjacent rims of articles A in a stack.

The inner ends of the separator slides 28 are provided with ledges 38 for underlying and supporting a stack of articles.

The sides of the inner ends of the upper separator slides 30 are angularly disposed, as shown. Said sides and ends are formed to provide end and side ledges 40 and 42 respectively which are relatively pointed, see Figs. 7 and 8. The sides of the inner ends of the support slides 32 are angularly disposed and said sides and inner ends of said slides are formed as ledges as at 44 and 46 respectively, as shown in Figs. 7 and 8.

The inner ends of the support slides, when in extended position, are adapted to underlie the rims of the lowermost articles of stacks thereof, and to support said stacks. The inner ends of the separator slides are adapted, as said slides are extended, to enter beneath or between the lowermost article of a stack and the article next above.

In Fig. 1, provision is made for plural stacks of articles, by means of the openings 20.

Each stack, in extended position of the support slides, is supported at at least three points. That is, by a support slide 38 of the pairs 22 and by the angularly disposed side ledges 44 of the support slides 32 of adjacent pairs 24 thereof.

Thus, as the actuator is oscillated in opposite directions, the support slides are moved inwardly to extended stack supporting position and the separator slides are moved to retracted position, and vice versa.

As the support slides retract from extended stack supporting positions to retracted positions and the separator slides move from retracted to extended positions, the lowermost articles of the stacks are released by the inner ends of the support slides and the inner ends of the separators enter above the article being released and the lowermost articles of the stacks.

In reverse movements of the slides of the pairs of slides, lowermost articles of the stacks are released by the separator slides and the support slides assume stack supporting position.

The rims of articles to be released may vary in thickness or formation and the vertical spacing therebetween may vary. The inner ends of the support and separator slides may take various forms to accommodate the articles of the stacks.

According to the invention, the ends of the slides will be so arranged that, as one slide retracts and the other is extended, successive articles are released.

Stack guides 50 have lower ends secured to the cover plate 6 and extend upwardly vertically therefrom. Said guides are arranged to hold a stack of articles in stacked relation.

Centering guides 52 are provided and are secured to the cover plate 6 by screws 54 and have lower inner leg surfaces 56, below inclined surfaces 58. The surfaces 58 and 56 of the guides 52 are arranged to center the articles relative to the openings 20 and slide members for accuracy in operation.

Thus it will be seen that successive articles are simultaneously discharged or released from plural stacks onto a conveyor or whatever may be desired.

The apparatus may be used with apparatus of various types for various purposes and is arranged to be operated in timed relation with such apparatus or equipment.

In Fig. 3, the apparatus is arranged for a single stack of articles. Plate 6 is replaced by plate 6' which is secured to the intermediate plate by the screws 8, in the manner described in connection with Fig. 1.

Said plate 6' is provided with an opening 60 for a stack of articles indicated by A'. Guide members 62 have lower ends secured to the cover plate 6' and extend vertically upwardly therefrom for guiding a stack of articles which may be plates or dishes.

Centering guides 64 similar to the guides 52 of Fig. 9 are provided on the plate 6' for centering the lowermost articles of the stack thereof.

The upper support slides 30 and 32 have been previously described and are reciprocable by the actuator 10 disposed beneath the plate 6' just as it was disposed below the plate 6' in the case of the form of Fig. 1.

The rims of the articles of the stack are supported by the inner ends 46 of the support slides 32. The slides of the pairs are extended and retracted by the actuator 10 as it oscillates and the slides of the pairs thereof function as the slides previously described to successively release or discharge the lowermost article of a stack.

It will be noted that the slides of the pairs 22 and 24 thereof are used for plural stacks of articles while the slides of the pairs 24 are employed for a single stack of articles. The slides of the pairs 22 may be removed when the apparatus is used for a single stack of articles, if that should be desirable.

The slides may have the angular slots thereof arranged relative to the inner ends of said slides to obtain the necessary extension of the inner end portions for articles of different diameters.

Changing the apparatus from a plural stack to a single stack arrangement and vice versa may be readily accomplished and thus plural articles may be discharged from plural stacks simultaneously or single articles may be discharged from a single stack.

This invention may be embodied in other specific forms without departing from the essential characteristics thereof. The present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

Apparatus for discharging successive articles simultaneously from plural vertical stacks thereof comprising in combination, a horizontal stationary supporting structure provided with a plurality of separate vertical openings for vertical stacks of articles having vertical axes disposed circumferentially around a central vertical axis, a plurality of pairs of superposed slides, each said pair including an elongated relatively narrow article separating slide having an inner end for engaging and separating a lowermost article from a stack thereof and an elongated relatively narrow article supporting slide having an inner end for engaging and supporting a stack of articles, the said slides for the pairs thereof arranged with the separating slide superposed on the supporting slide, the supporting structure provided with separate horizontal guideways for the pairs of slides arranged whereby the slides of the pairs thereof may reciprocate in a straight line relative to one another between outer positions and extended positions where inner ends thereof are disposed in extended inner article engaging positions in said openings, certain of said guideways arranged for reciprocably guiding the slides therein radially of the axes of each of said openings and other of said guideways disposed between the certain guideways arranged for reciprocably guiding the slides therein radially of said central axis and between adjacent sides of adjacent openings, the inner end of each of the pairs thereof slide in said other guideways being formed to simultaneously engage the adjacent sides of articles in said adjacent openings, a ring-like actuator surrounding said openings and guide means provided in said supporting structure guiding said actuator horizontally for oscillating in opposite operating directions, means for oscillating said actuator in opposite direction, the slides of the pairs thereof being provided with relatively angularly disposed slots extending therethrough, said actuator provided with members disposed in the slots of the slides of the pairs thereof arranged whereby as the actuator is moved in opposite directions the slides of the pairs thereof are simultaneously reciprocated in opposite directions, guide means around each article openings extending upwardly from said supporting structure for guiding a stack of articles, and groups of relatively spaced centering members around each opening for centering articles therein relative to the axis of said opening.

References Cited in the file of this patent
UNITED STATES PATENTS

| | | |
|---|---|---|
| 1,593,717 | Frick | July 27, 1926 |
| 1,660,247 | Wooten et al. | Feb. 21, 1928 |
| 1,680,238 | Baker | Aug. 7, 1928 |
| 1,742,371 | Simmons | Jan. 7, 1930 |
| 2,037,752 | Bares | Aug. 21, 1936 |
| 2,304,437 | Bell | Dec. 8, 1942 |
| 2,489,765 | Emerson et al. | Nov. 29, 1949 |
| 2,521,227 | Kelly | Sept. 5, 1950 |
| 2,538,185 | Anderson | Jan. 16, 1951 |
| 2,561,723 | Berger | July 24, 1951 |
| 2,602,556 | Sheehan | July 8, 1952 |
| 2,604,245 | Shaw | July 22, 1952 |
| 2,730,268 | Moesch | Jan. 10, 1956 |
| 2,796,711 | Rich | June 25, 1957 |